Patented July 21, 1925.

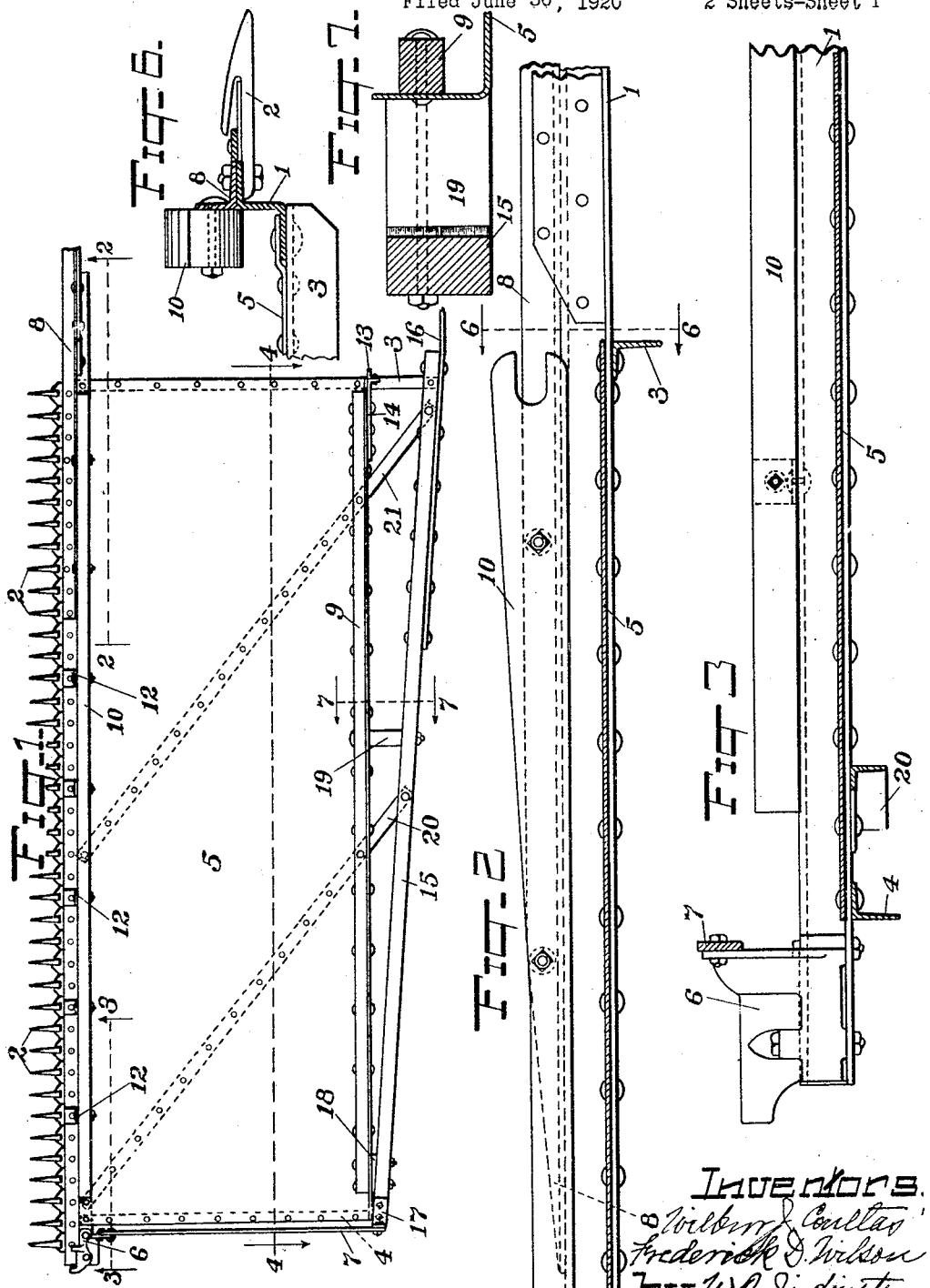

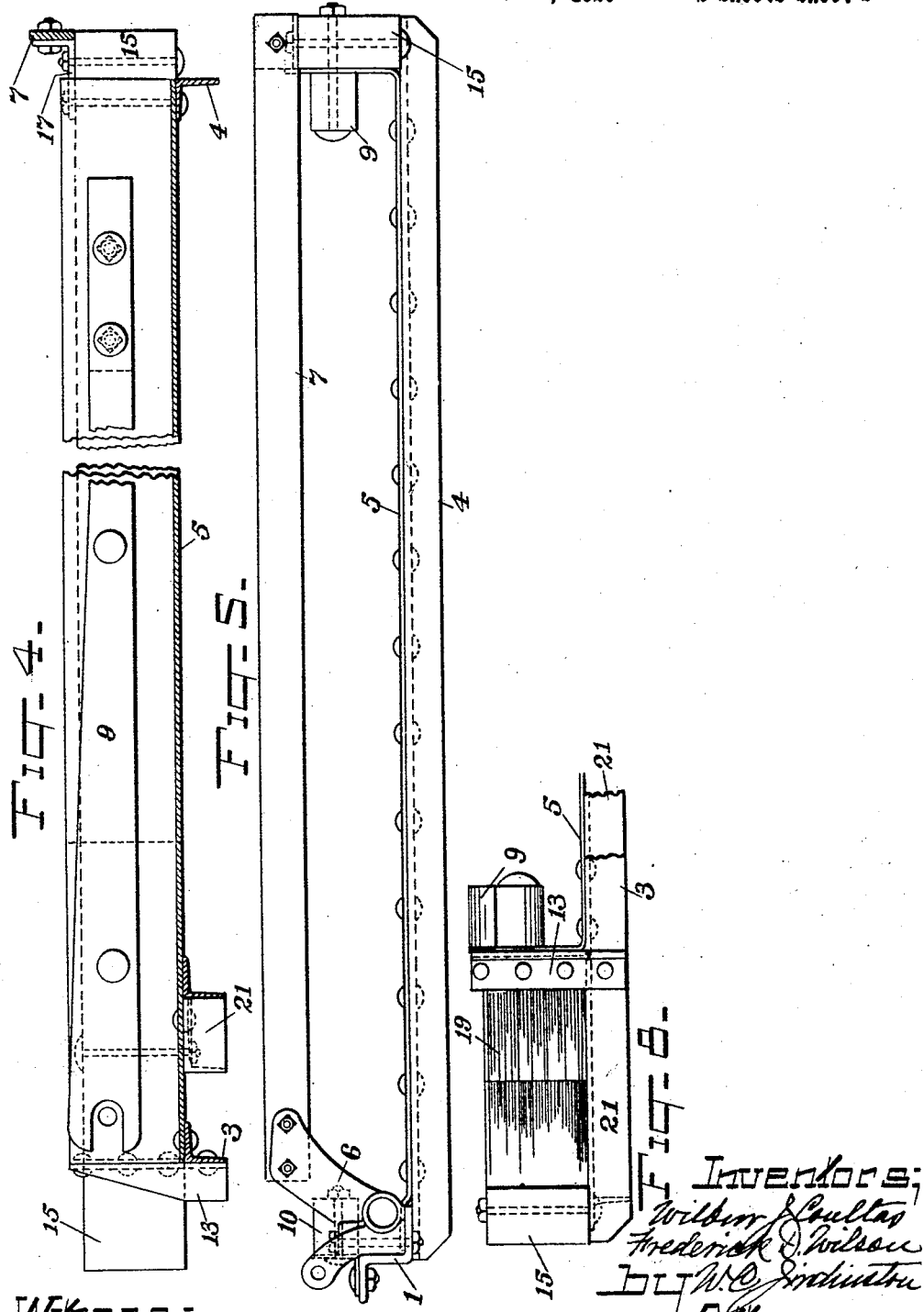

1,546,436

UNITED STATES PATENT OFFICE.

WILBUR J. COULTAS AND FREDERICK D. WILSON, OF MOLINE, ILLINOIS, ASSIGNORS TO DEERE & COMPANY, OF MOLINE, ILLINOIS, A CORPORATION OF ILLINOIS.

HARVESTER PLATFORM.

Application filed June 30, 1920. Serial No. 393,031.

To all whom it may concern:

Be it known that we, WILBUR J. COULTAS and FREDERICK D. WILSON, citizens of the United States, residing at Moline, in the county of Rock Island and State of Illinois, have invented certain new and useful Improvements in Harvester Platforms, of which the following is a specification, reference being had therein to the accompanying drawing.

Our invention relates to harvesting machinery and more particularly to the platform of harvesters and binders, and the object of our invention is to provide a harvester platform constructed to withstand varying strains to which it is usually subject.

Referring to the drawings in which similar numerals indicate identical parts—

Figure 1 is a plan view of a harvester platform with canvas and rollers omitted.

Figure 2 is a sectional detail indicated by the arrows and line 2—2 of Figure 1.

Figure 3 is a sectional detail indicated by the arrows and line 3—3 of Figure 1.

Figure 4 is a section on the line 4—4 of Figure 1 viewed from the front of the platform.

Figure 5 is an outer end elevation of the platform.

Figure 6 is a sectional detail on the line 6—6 of Figure 2.

Figure 7 is a sectional detail on the line 7—7 of Figure 1, and

Figure 8 is a fragmentary end view of the inner end of the platform.

The frame of the platform as usually constructed is composed of a Z bar 1 to which is securely bolted the guard finger 2. Angle bars 3 and 4 are rigidly secured to the bar 1 and extend rearwardly at right angles thereto. The bottom 5 of the platform is formed preferably of sheet metal riveted to the bar 1 and the bars 3 and 4. A casting 6 is mounted on the grainward end of the bar 1 and has a bar 7 bolted thereto and extending rearward parallel to the bar 4. A supporting angle bar 8 is riveted to the stubbleward portion of the bar 1 and supports the latter on the harvester frame in a well known manner, common in the art but not shown in the drawing.

The rear of the platform bottom 5 is bent vertically and to the inner face of it is bolted a rear frame bar 9 parallel to the bar 1, and preferably of wood; a similar bar 10, parallel with the bar 9 is secured to the bar 8 and to angle pieces 12 rigid on the bar 1. The bars 9 and 10 are such as commonly employed to support the rollers and canvas of the platform conveyor. At the rear stubbleward end of the platform, to add rigidity to the structure at that point, we provide a standard 13, which is riveted to the bar 3, and a brace 14 which is rigidly secured to the standard 13 and extends grainwardly and is riveted to the rear bent portion of the bottom 5 and to the bar 9.

Bolted on the rear end of the frame bar 4 is a beam 15 which extends stubbleward at a rearward angle to the rear of the platform and is rigidly secured to part 16 of the harvester frame, and also to the bar 3 of the harvester platform frame which is extended rearward beyond the latter. An angular bracket 17 is mounted on the grainward end of the beam 15 and rigidly bolted to the rear end of said bracket is the rear end of the bar 7. A wedge shaped block 18 is inserted between the grainward end of the beam 15 and the rear of the platform and is held in place by suitable bolts, and intermediate the ends of the beam 15 a block 19 is secured in place by suitable bolts which pass through said block, and through the beam 15 and the bar 9. Rigidly secured to the underside of the bar 1 and extended diagonally rearward and stubbleward is a brace 20 having its rearward portion projected beyond the platform and bolted to the beam 15. A similar brace 21 is bolted or riveted to the bar 1, parallel with the brace 20, and is also extended beyond the platform and secured to the beam 15 adjacent the stubbleward end of the latter; the side bar 3 is also projected beyond the platform and rigidly connected to the beam 15. Both of the braces 20 and 21 are angle bars and the bottom 5 is securely riveted thereto.

In general the weaker part of a harvester and binder is the platform upon which cut grain is received to be conveyed to the elevator on its way to the binding mechanism, and while the stubbleward end of the platform is sufficiently rigid by reason of its front and rear connection to the main frame of the harvester, the grainward end, being supported by a grain wheel only, is liable to sag, particularly in a forward direction, and the grainward end of the front of the platform has a tendency to drop and consequently destroy that parallelism of the cutting mechanism with the ground which is essential to efficient operation. With our construction, as shown and described, we have overcome the weakness of the platform as ordinarily constructed, and strengthened it in such a manner as to preserve that proper alinement of the parts necessary to efficient harvesting.

What we claim is:—

1. In a platform for harvesters, the combination of a frame comprising front and rear bars and side bars, a beam extending stubbleward at an angle to the rear bar, and braces secured to the beam and extending diagonally grainward and secured to the front bar.

2. In a platform for harvesters, the combination of a frame comprising front and rear bars and side bars, a beam extending stubbleward at an angle to the rear bar, and a plurality of braces secured to the beam and extending in parallelism diagonally grainward and secured to the front bar.

3. In a platform for harvesters, the combination of a frame comprising a front bar and side bars, a metallic bottom secured to said bars and having its rear portion bent upward in a plane parallel to the front bar, and a beam located rearward of said bottom and extending stubbleward at an angle to the front bar and secured thereto.

4. In a platform for harvesters, the combination of a frame comprising a front bar, a grainward side bar and a stubbleward side bar, a beam extending stubbleward at an angle to the front bar and secured to the side bars, braces secured to the beam and extending diagonally grainward and secured to the front bar, and a metallic bottom secured to the front and side bars and to said braces.

5. In a platform for harvesters, the combination of a frame comprising a front bar, a grainward side bar and a stubbleward side bar, a beam extending stubbleward at an angle to the front bar and secured to the side bars, a standard secured on the stubbleward side bar, a metallic bottom secured to said bars and having its rear portion bent upward in a plane parallel to the front bar and secured to said standard and the grainward end of the beam.

6. In a platform for harvesters, the combination of a frame comprising a front bar, a grainward side bar and a stubbleward side bar, a beam extending stubbleward at an angle to the front bar and secured to the side bars, a standard secured on the stubbleward side bar, braces secured to said beam and extending diagonally grainward and secured to the front bar, a metallic bottom secured to said bars and having its rear portion bent upward in a plane parallel to the front bar and secured to said standard and the grainward end of the beam, and means to secure said bottom to the front and side bars and to said braces.

WILBUR J. COULTAS.
FREDERICK D. WILSON.